(12) United States Patent
Joshi et al.

(10) Patent No.: US 11,092,077 B2
(45) Date of Patent: Aug. 17, 2021

(54) AIRCRAFT COMPONENT AND METHOD OF MANUFACTURE

(71) Applicant: PRATT & WHITNEY CANADA CORP., Longueuil (CA)

(72) Inventors: Ninad Joshi, Brampton (CA); Sid-Ali Meslioui, Brossard (CA); François Richard, St-Denis-sur-Richelieu (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 618 days.

(21) Appl. No.: 15/938,371

(22) Filed: Mar. 28, 2018

(65) Prior Publication Data

US 2019/0301370 A1    Oct. 3, 2019

(51) Int. Cl.
*F02C 7/24* (2006.01)
*B32B 3/12* (2006.01)
(Continued)

(52) U.S. Cl.
CPC .................. *F02C 7/24* (2013.01); *B32B 3/12* (2013.01); *B32B 3/266* (2013.01); *B32B 5/02* (2013.01); *B32B 7/04* (2013.01); *B32B 7/08* (2013.01); *B32B 7/10* (2013.01); *B32B 9/005* (2013.01); *B32B 9/04* (2013.01); *B32B 15/20* (2013.01); *B32B 27/06* (2013.01); *C08J 5/04* (2013.01); *E04B 1/74* (2013.01); *E04B 1/82* (2013.01); *E04B 1/84* (2013.01); *F01D 25/24* (2013.01); *F02C 7/045* (2013.01); *F02K 1/827* (2013.01); *G10K 11/168* (2013.01); *B23K 26/342* (2015.10); *B32B 2262/106* (2013.01); *B32B 2307/10* (2013.01); *B32B 2307/102* (2013.01);
(Continued)

(58) Field of Classification Search
CPC ... B32B 7/08; B32B 3/12; F02C 7/045; F02C 7/24; F02K 1/827; G10K 11/168; F05D 2250/283; F05D 2260/96; F05D 2260/963
USPC .......................................................... 181/292
See application file for complete search history.

(56) References Cited

U.S. PATENT DOCUMENTS 3,526,072 A * 9/1970 Campbell ................. F16B 5/01
                                                  52/787.1
3,910,374 A * 10/1975 Holehouse ................ B32B 3/12
                                                  181/292
(Continued)

FOREIGN PATENT DOCUMENTS

EP          3042755 A1    7/2016
WO       2004077400 A2    9/2004

OTHER PUBLICATIONS

European Patent Office, Communication—extended European search report re. European patent application No. 19165954.9, dated Aug. 23, 2019.
(Continued)

*Primary Examiner* — Jeremy A Luks
(74) *Attorney, Agent, or Firm* — Norton Rose Fulbright Canada LLP

(57) ABSTRACT

An aircraft component and an associated method of manufacturing such aircraft component are disclosed. The aircraft component comprises a backing member, a porous sheet spaced apart from the backing member, and a cellular structure disposed between the backing member and the porous sheet. The cellular structure is attached to at least one of the backing member and the porous sheet by one or more non-adhesive connections.

20 Claims, 10 Drawing Sheets

(51) Int. Cl.

| | | |
|---|---|---|
| G10K 11/168 | (2006.01) | |
| F02C 7/045 | (2006.01) | |
| B32B 7/08 | (2019.01) | |
| F02K 1/82 | (2006.01) | |
| B32B 3/26 | (2006.01) | |
| B32B 7/10 | (2006.01) | |
| B32B 15/20 | (2006.01) | |
| F01D 25/24 | (2006.01) | |
| B32B 5/02 | (2006.01) | |
| E04B 1/74 | (2006.01) | |
| C08J 5/04 | (2006.01) | |
| B32B 9/00 | (2006.01) | |
| B32B 7/04 | (2019.01) | |
| B32B 9/04 | (2006.01) | |
| E04B 1/84 | (2006.01) | |
| B32B 27/06 | (2006.01) | |
| E04B 1/82 | (2006.01) | |
| B33Y 10/00 | (2015.01) | |
| B33Y 80/00 | (2015.01) | |
| B23K 26/342 | (2014.01) | |

(52) U.S. Cl.
CPC ... *B32B 2307/724* (2013.01); *B32B 2605/003* (2013.01); *B32B 2605/18* (2013.01); *B32B 2607/00* (2013.01); *B33Y 10/00* (2014.12); *B33Y 80/00* (2014.12); *F05D 2220/323* (2013.01); *F05D 2230/31* (2013.01); *F05D 2230/60* (2013.01); *F05D 2250/283* (2013.01); *F05D 2260/96* (2013.01); *F05D 2260/963* (2013.01); *F05D 2300/514* (2013.01)

(56) References Cited

U.S. PATENT DOCUMENTS

| | | | | |
|---|---|---|---|---|
| 4,271,219 A * | 6/1981 | Brown | ....................... | B32B 3/12 |
| | | | | 156/292 |
| 5,041,323 A * | 8/1991 | Rose | ....................... | B32B 15/02 |
| | | | | 428/116 |
| 5,460,865 A * | 10/1995 | Tsotsis | ..................... | E04C 2/365 |
| | | | | 428/116 |
| 6,203,656 B1 * | 3/2001 | Syed | ................... | B29C 65/5057 |
| | | | | 156/292 |
| 6,536,556 B2 * | 3/2003 | Porte | .................... | G10K 11/172 |
| | | | | 181/292 |
| 8,579,225 B2 * | 11/2013 | Mardjono | ................. | F02C 7/24 |
| | | | | 244/1 N |
| 8,640,825 B2 * | 2/2014 | Vauchel | ............... | G10K 11/172 |
| | | | | 181/292 |
| 8,763,753 B2 * | 7/2014 | Kray | ........................ | F02C 7/24 |
| | | | | 181/292 |
| 8,820,477 B1 * | 9/2014 | Herrera | ................ | G10K 11/168 |
| | | | | 181/292 |
| 8,967,330 B2 * | 3/2015 | Comon | ..................... | F16B 5/01 |
| | | | | 181/292 |
| 9,127,452 B1 | 9/2015 | Winfield et al. | | |
| 9,447,576 B2 * | 9/2016 | Liou | .................... | B32B 37/146 |
| 9,688,050 B2 | 6/2017 | Carlson et al. | | |

OTHER PUBLICATIONS

European Patent Office, Communication—European patent application No. 19165954.9, dated May 11, 2020.

Dehns Patent and Trade Mark Attorneys, Response to Extended European Search Report, dated Apr. 2, 2020 re: European patent application No. 19165954.9.

* cited by examiner

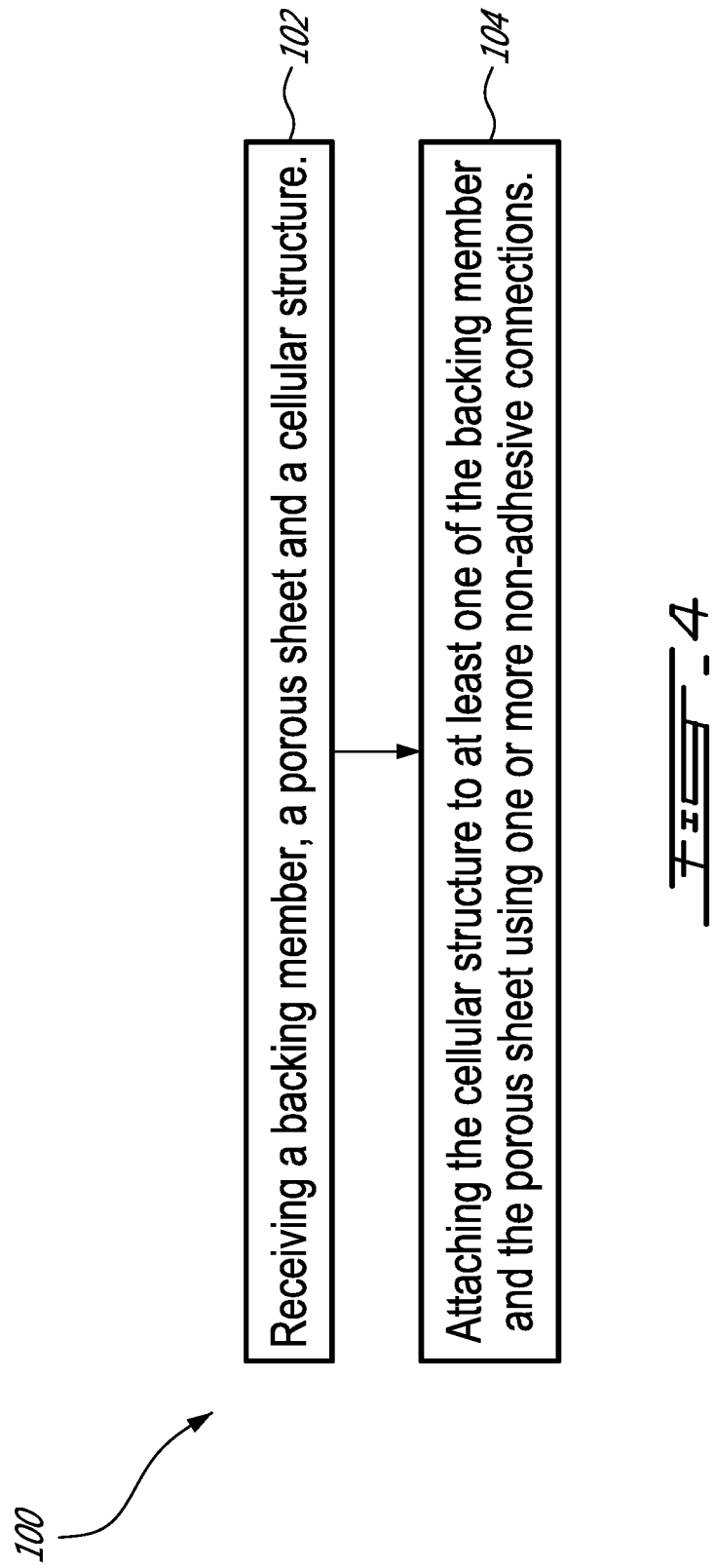

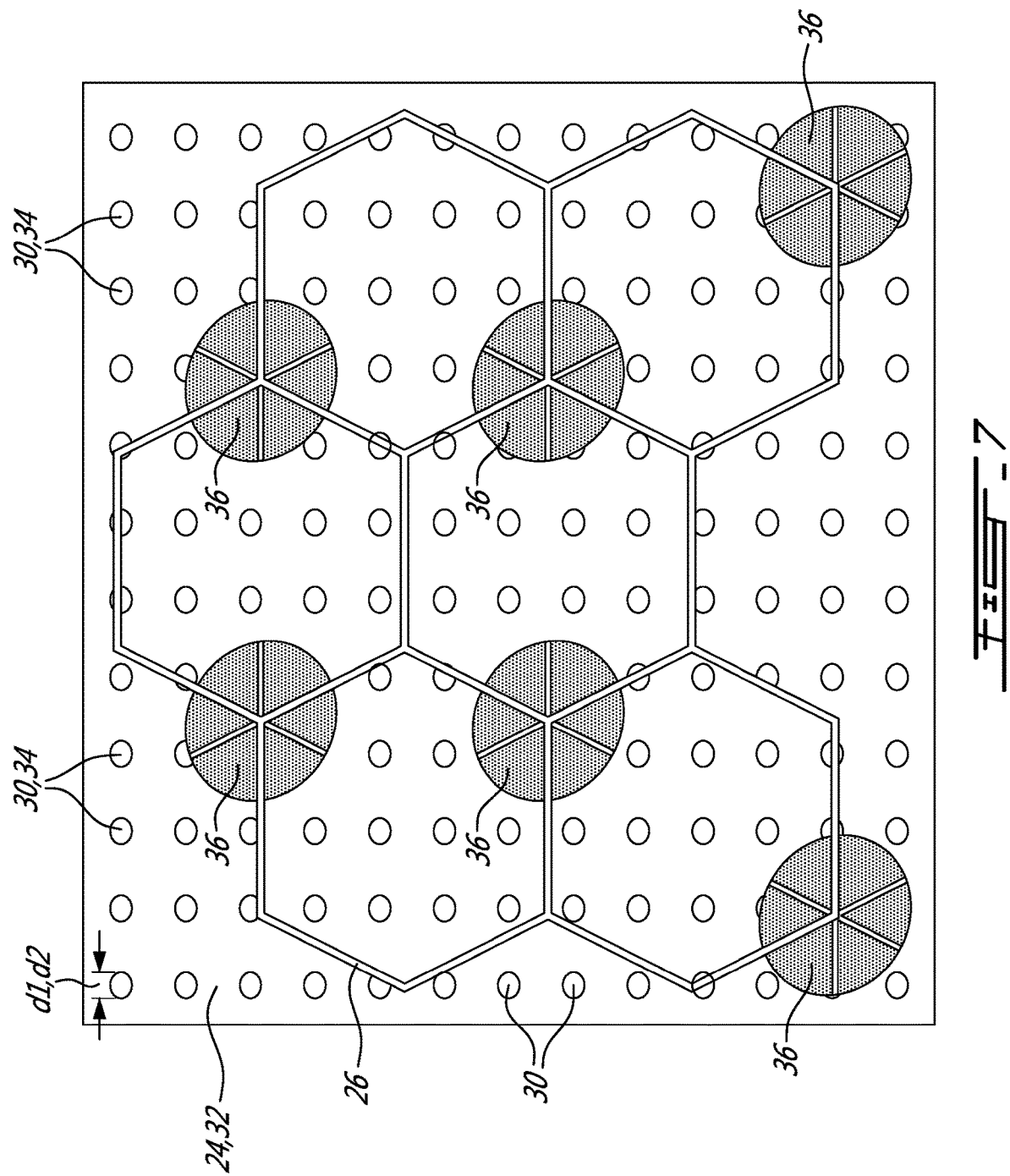

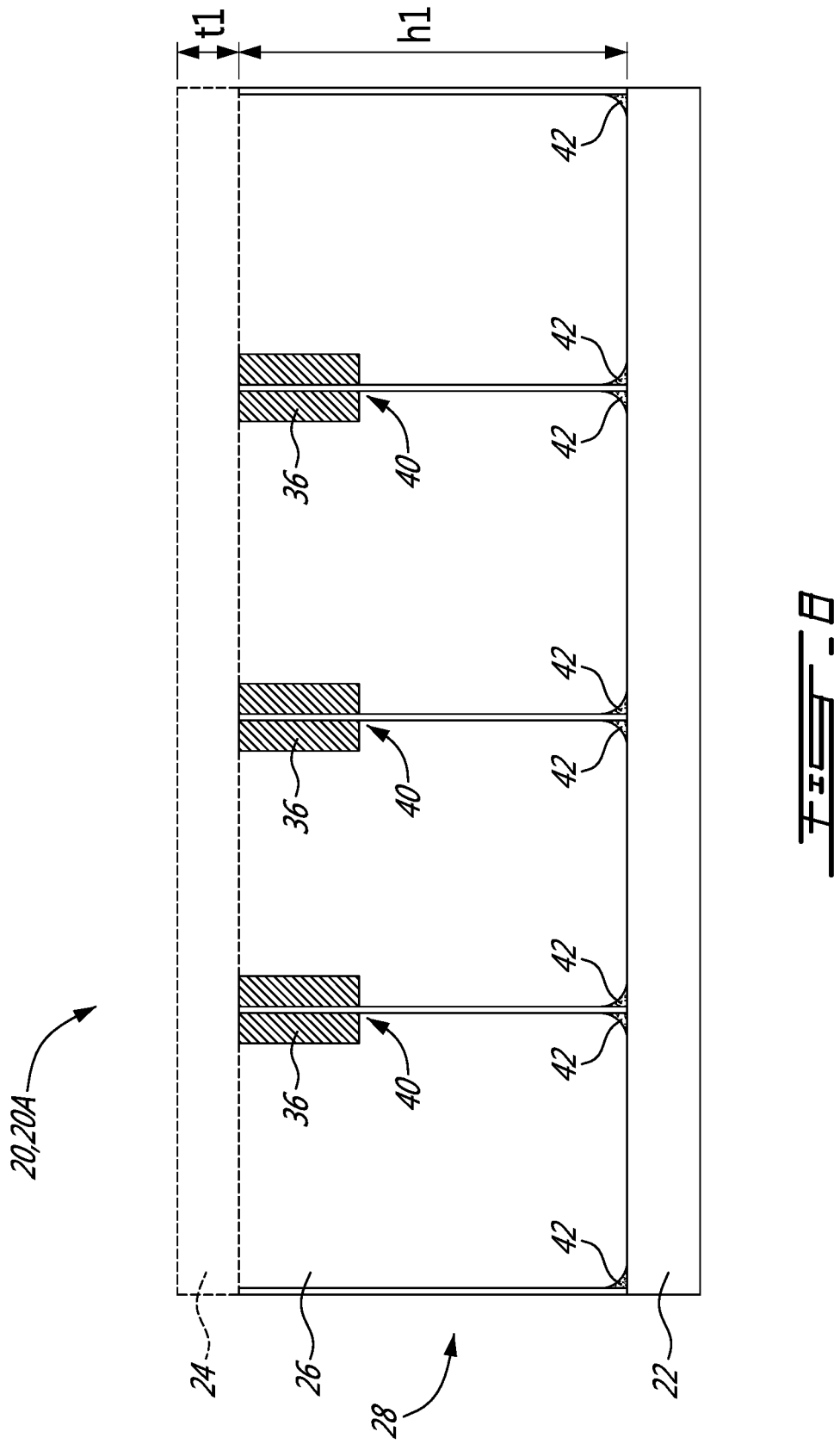

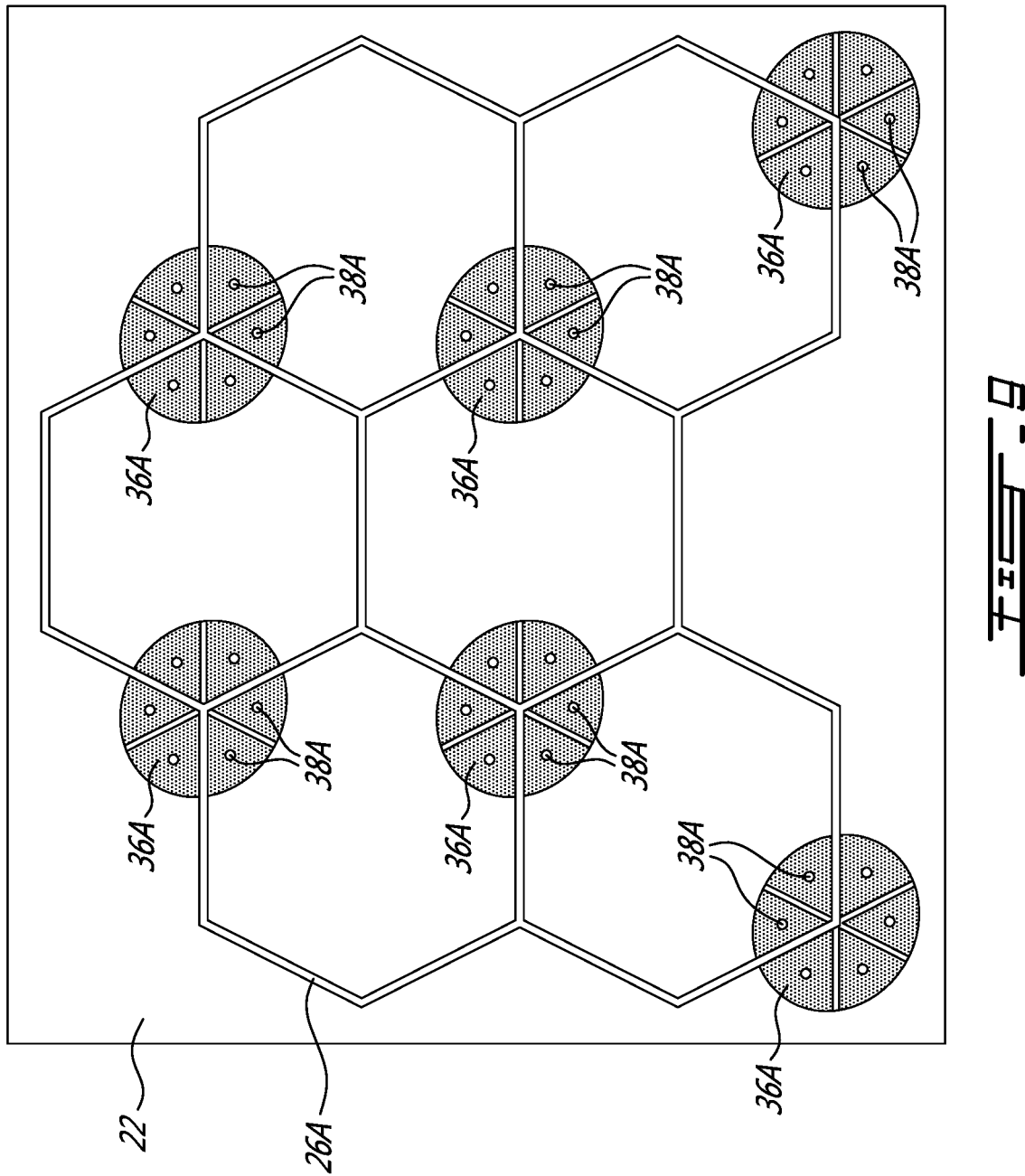

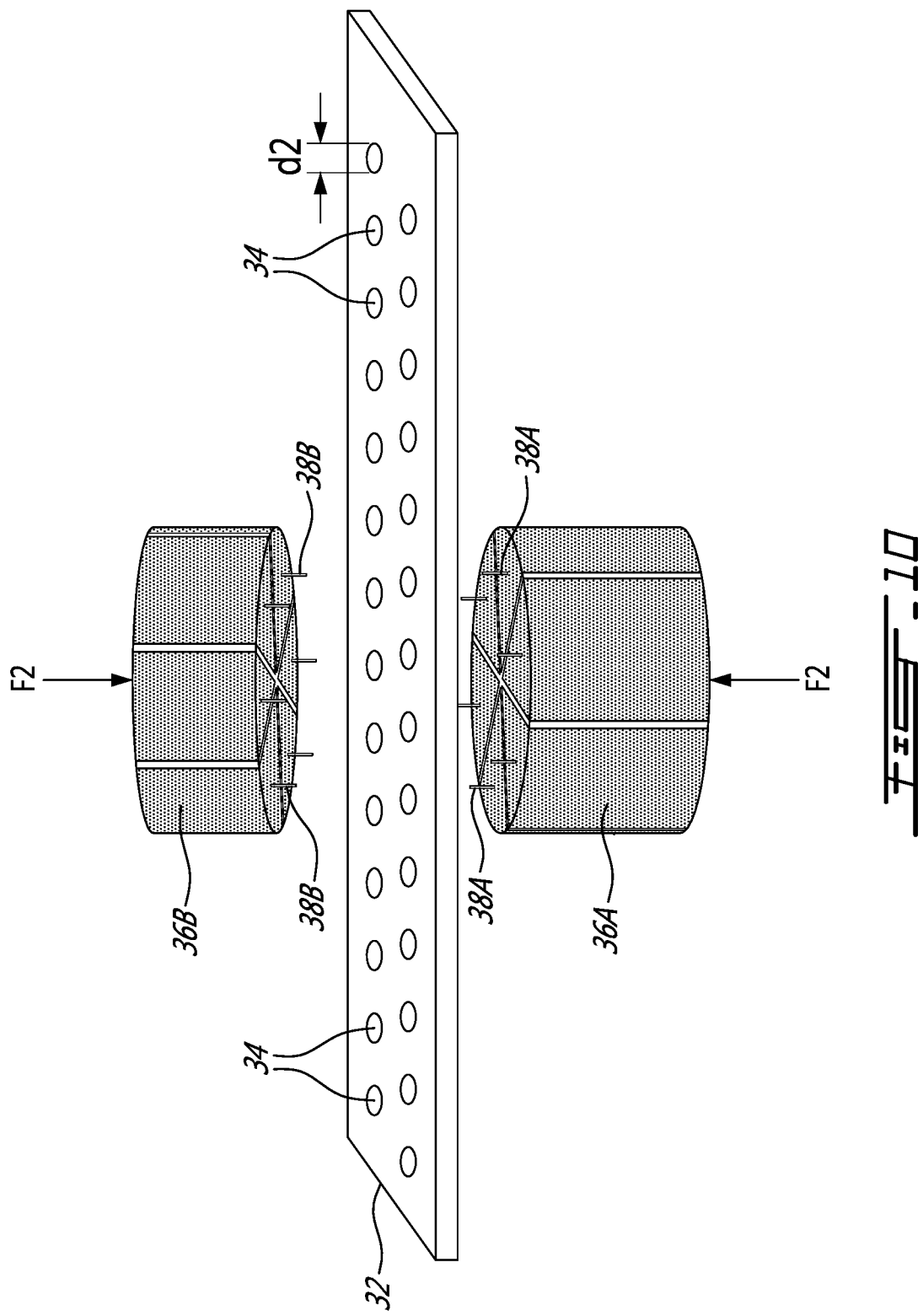

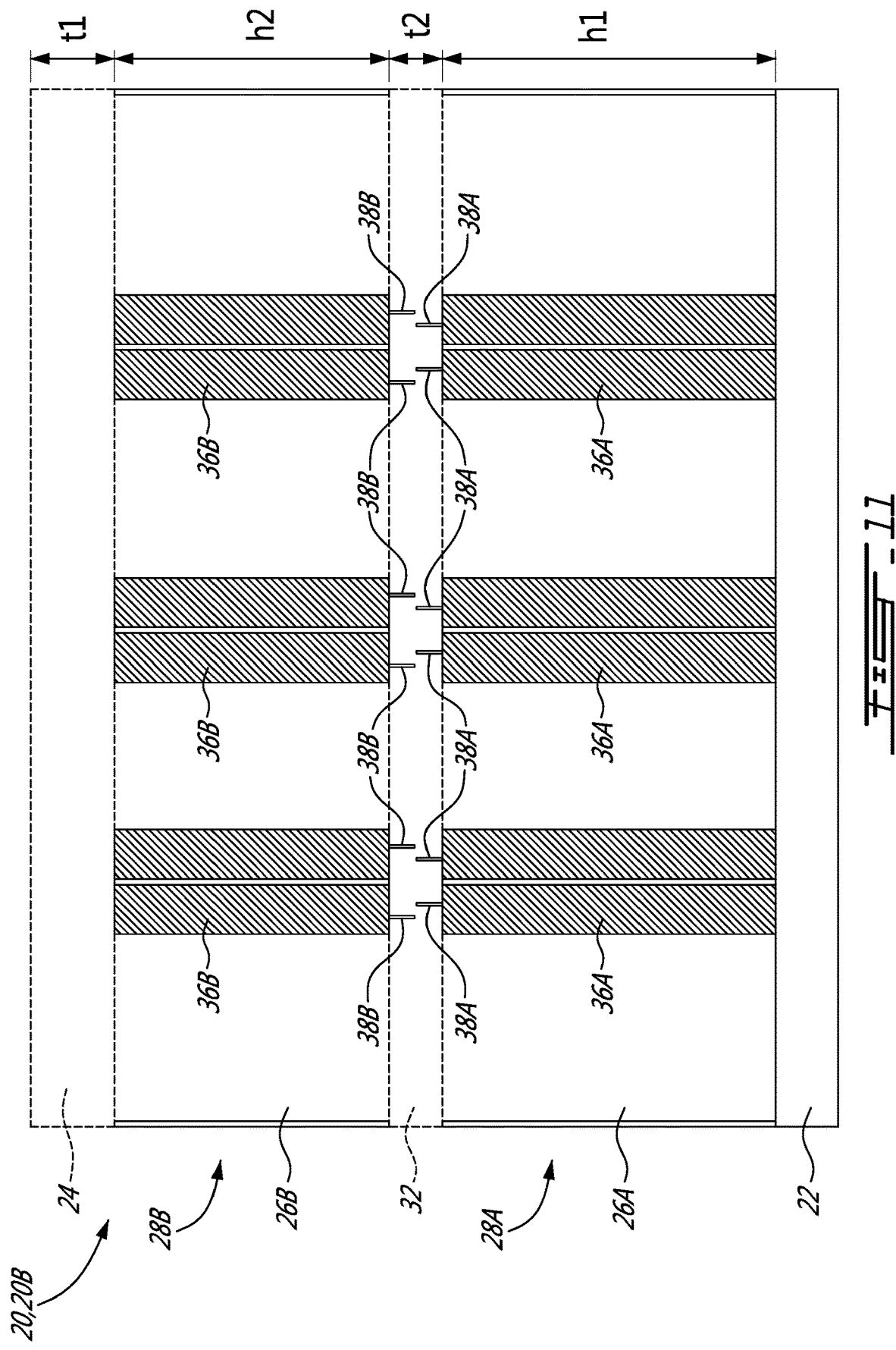

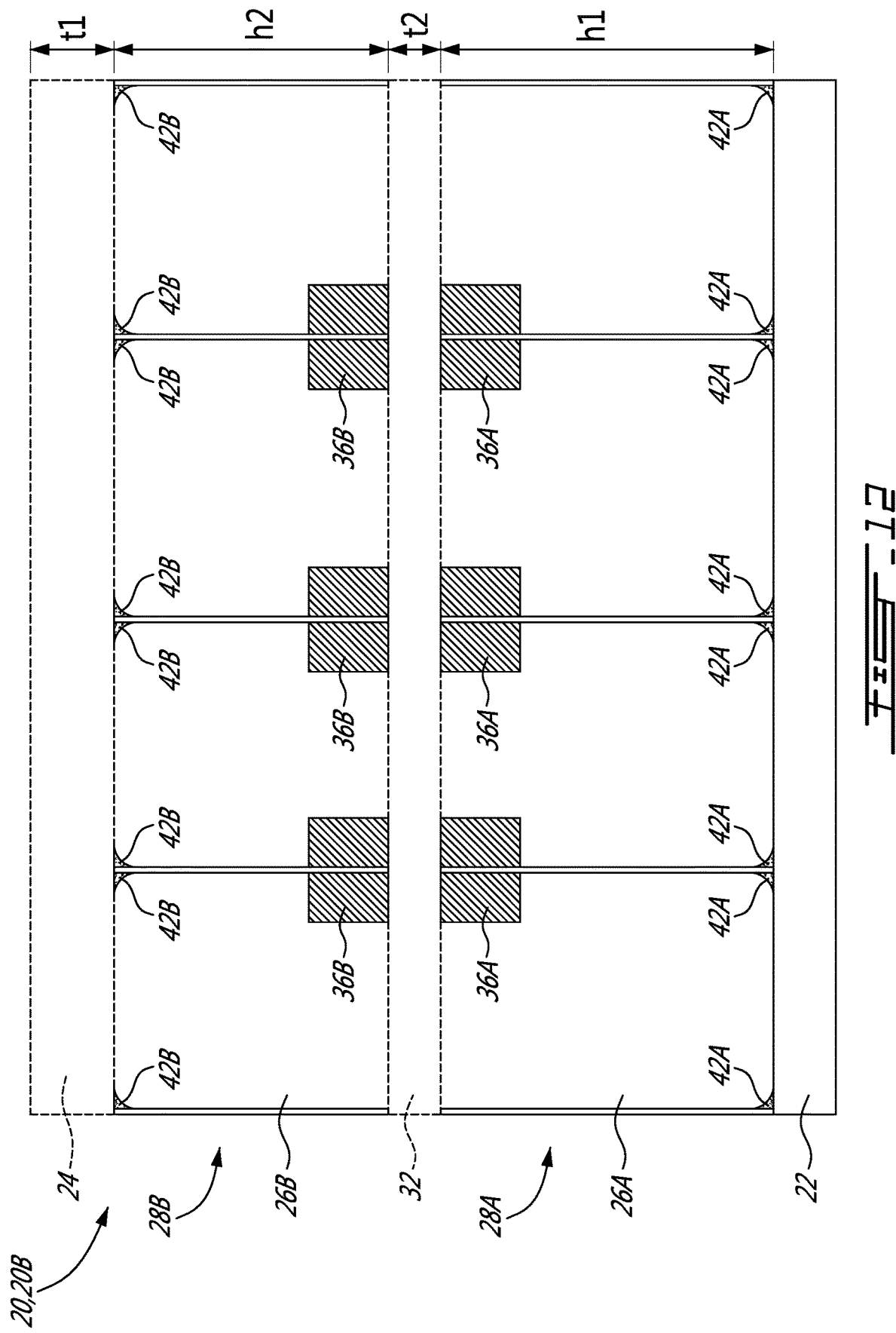

AIRCRAFT COMPONENT AND METHOD OF MANUFACTURE

TECHNICAL FIELD

The disclosure relates generally to aircraft components, and more particularly to structure and manufacturing of such components.

BACKGROUND

A gas turbine engine powering an aircraft in flight produces noise and acoustic treatment in the engine can be used to attenuate such noise. Different types of acoustic treatments are used gas turbine engines. A single-degree of freedom (SDOF) acoustic panel construction can include a honeycomb core disposed between a backing sheet and a porous (e.g., perforated) facing sheet. The space between the backing sheet and the facing sheet defines a noise-attenuating cavity. A double-degree of freedom (DDOF) acoustic panel construction can include two honeycomb cores joined together at an intermediate porous septum. The arrangement of the two honeycomb cores and the septum are disposed between a backing sheet and a porous (e.g., perforated) facing sheet to define two noise-attenuating cavities.

Components of such acoustic treatment are typically assembled and joined together using an adhesive reticulation process where a film-adhesive is used to join the edges of the honeycomb cells to the facing sheet and backing sheet. During the joining process, some excess adhesive material can flow into and block holes formed into the facing sheet of the acoustic panel. The blocking of the holes by the adhesive material can reduce the noise attenuation efficiency of the acoustic panel.

SUMMARY

In one aspect, the disclosure describes an aircraft component comprising:
  a backing member;
  a porous sheet spaced apart from the backing member to define a cavity between the backing member and the porous sheet; and
  a cellular structure disposed between the backing member and the porous sheet, the cellular structure being attached to at least one of the backing member and the porous sheet by one or more non-adhesive connections.

The porous sheet may be a facing sheet of the aircraft component and the cellular structure may be attached to the facing sheet via the one or more non-adhesive connections.

The porous sheet may be a facing sheet of the aircraft component and the aircraft component may comprise a connection member secured to the facing sheet and frictionally engaged with the cellular structure.

The connection member may be metallurgically bonded to the facing sheet.

The aircraft component may comprise a septum disposed between two cavities defined between the backing member and the facing sheet of the aircraft component. The cellular structure may be attached to the septum via the one or more non-adhesive connections.

The aircraft component may comprise a fastener secured to the facing sheet and frictionally engaged with the septum. The fastener may penetrate the septum.

The cellular structure may be attached to the backing member via the one or more non-adhesive connections.

The aircraft component may comprise a connection member secured to the backing member and frictionally engaged with the cellular structure.

The connection member may be metallurgically bonded to the backing member.

The porous sheet may be a septum disposed between two cavities of the aircraft component. The cellular structure may be attached to the septum via the one or more non-adhesive connections.

The aircraft component may comprise a fastener secured to the backing member and frictionally engaged with the septum.

Embodiments can include combinations of the above features.

In another aspect, the disclosure describes an aircraft component comprising:
  a backing member;
  a septum spaced apart from the backing member to define a first cavity between the backing member and the septum;
  a first cellular structure disposed between the backing member and the septum, the first cellular structure being attached to at least one of the backing member and the septum by one or more first non-adhesive connections;
  a facing sheet spaced apart from the septum to define a second cavity between the septum and the facing sheet; and
  a second cellular structure disposed between the septum and the facing sheet, the second cellular structure being attached to at least one of the septum and the facing sheet by one or more second non-adhesive connections.

The aircraft component may comprise: a first connection member secured to the backing member and frictionally engaged with the first cellular structure; and a second connection member secured to the facing sheet and frictionally engaged with the second cellular structure.

The first connection member may be metallurgically bonded to the backing member. The second connection member may be metallurgically bonded to the facing sheet.

The aircraft component may comprise: a first fastener metallurgically bonded to the first connection member and frictionally engaged with the septum; and a second fastener metallurgically bonded to the second connection member and frictionally engaged with the septum.

Embodiments can include combinations of the above features.

In a further aspect, the disclosure describes a method of manufacturing an aircraft component. The method may comprise:
  receiving a backing member, a porous sheet and a cellular structure; and
  assembling the cellular structure between the backing member and the porous sheet so that the backing member and the porous sheet are spaced apart to define a cavity therebetween, wherein assembling the cellular structure between the backing member and the porous sheet comprises attaching the cellular structure to at least one of the backing member and the porous sheet using one or more non-adhesive connections.

The method may comprise:
  using additive manufacturing to form a connection member on the backing member or on the porous sheet; and
  frictionally engaging the cellular structure with the connection member.

The porous sheet may be a septum for assembling between two cavities defined between the backing member and a facing sheet of the aircraft component. The cellular structure may be a first cellular structure for assembling between the septum and the backing member. The method may further comprise:

using additive manufacturing to form a first connection member on the backing member;

frictionally engaging the first cellular structure with the first connection member;

receiving the facing sheet;

using additive manufacturing to form a second connection member on the facing sheet;

receiving a second cellular structure for assembling between the septum and the facing sheet; and frictionally engaging the second cellular structure with the second connection member.

The method may comprise: using additive manufacturing to form a first fastener on the first connection member and a second fastener on the second connection member; and frictionally engaging the first and second fasteners with the septum.

Embodiments can include combinations of the above features.

Further details of these and other aspects of the subject matter of this application will be apparent from the detailed description included below and the drawings.

DESCRIPTION OF THE DRAWINGS

Reference is now made to the accompanying drawings, in which:

FIG. 4 is a flowchart of an exemplary method for manufacturing a component;

FIG. 7 is a schematic representation of a plurality of connection members providing non-adhesive connections between a porous sheet and a cellular structure;

FIG. 8 is a schematic elevation view of an exemplary SDOF acoustic panel comprising non-adhesive connections;

FIG. 9 is a schematic representation of a plurality of connection members providing non-adhesive connections between a backing member and a cellular structure;

FIG. 10 is a schematic representation of an exemplary process for forming non-adhesive connections with a septum of a DDOF acoustic panel;

FIG. 11 is a schematic elevation view of an exemplary DDOF acoustic panel comprising non-adhesive connections; and FIG. 12 is a schematic elevation view of another exemplary DDOF acoustic panel comprising non-adhesive connections.

DETAILED DESCRIPTION

Figure 1:
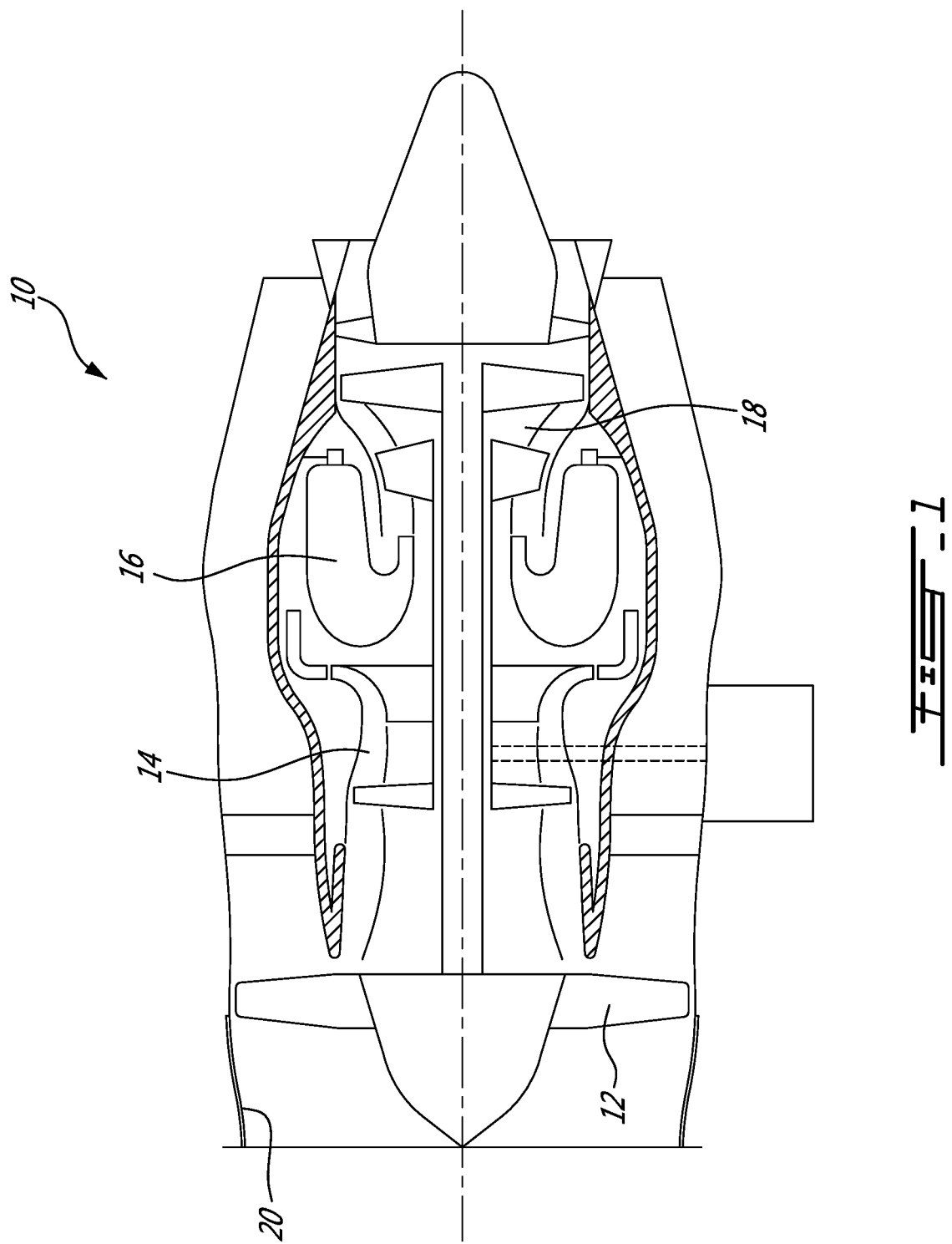
FIG. 1 shows a schematic axial cross-section view of a turbo-fan gas turbine engine.

The following description relates to components (e.g., panels) of aircraft and methods for manufacturing (e.g., including assembling) such components. The aircraft components disclosed herein may be suitable for use on aircraft structures (i.e., airframes) or on aircraft engines for example. In various embodiments, the aircraft components disclosed herein may serve structural and/or noise-attenuating function(s). In various embodiments, the aircraft components disclosed herein may comprise or be part of walls, panels, liners or ducts for example. In some embodiments, the aircraft components disclosed herein may serve as acoustic treatment and may be referred to as "acoustic panels" or "acoustic liners" with desirable noise-attenuating properties. Such aircraft components may be installed to line a duct (e.g., inlet duct or bypass duct) of a gas turbine engine or may be installed in any other location(s) such as inside a passenger cabin of an aircraft or on the exterior of an aircraft where noise attenuation is desirable.

While the following description relates to acoustic treatment (e.g., panels) for aircraft applications, it is understood that such components may be suitable for use in other applications. In some embodiments, the components and methods disclosed herein make use of non-adhesive (e.g., mechanical, glue-less) connections for assembling the components together so that the need for adhesive material (e.g., glue) used in conventional assembly methods such as adhesive reticulation can be reduced or eliminated. In the case of acoustic panels, the reduction or elimination of adhesive material in turn can reduce or eliminate the risk of excess adhesive material flowing into and blocking holes formed into the facing sheet and/or the septum of such acoustic panels. In some embodiments, the use of non-adhesive connections may also provide desirable structural load-bearing capacity of such acoustic panels.

In some embodiments, a suitable additive manufacturing process may be used for forming suitable structures for providing non-adhesive connections between parts of the aircraft components. It is understood that other manufacturing processes may be used instead of or in addition to additive manufacturing for producing such structure(s). Also, the specific structure(s) (e.g., connection members) disclosed herein for providing the non-adhesive connections are provided as examples only and it is understood that other/different types of structure(s) (e.g., "slide and lock" features) may be suitable for providing non-adhesive connections.

As referenced herein, additive manufacturing includes processes of joining materials to make objects from 3D model data, usually layer upon layer, as opposed to subtractive manufacturing processes. Additive manufacturing processes are sometimes also referred to as 3D printing, additive fabrication, additive processes, additive techniques, additive layer manufacturing, layer manufacturing, and free-form fabrication. For example, additive manufacturing can include directed energy deposition where focused thermal energy is used to fuse material(s) (e.g., in powder form) by melting as it/they is/are being deposited.

A suitable additive manufacturing process for metals such as, for example, Powder-Bed-Fusion by Laser (also known as "DMLS") can be used. Material additive processes that are be used for adding functional metallic components to a substrate may be suitable. Such additive manufacturing processes may include a suitable laser-based material additive process such as a laser material (e.g., powder) deposition process. For example, a suitable additive manufacturing process may comprise irradiating a laser beam onto a metallic substrate to produce a molten pool of metal into which a metallic powder is injected in order to increase the size of the molten pool and simultaneously causing movement between the laser beam/powder stream and the substrate along a desired trajectory to build a layer of the feature that is being added. The addition (i.e., stacking) of subsequent layers may be used to achieve a desired height and geometry of the added feature. Such additive manufacturing process may make use of a multi-axis computer numerical control (CNC) system to cause movement between the laser beam/powder stream and the substrate in order to add a feature of desired geometry. In some embodiments, the use of additive manufacturing may provide some flexibility and freedom with designing the geometry of applicable structures.

Aspects of various embodiments are described through reference to the drawings.

FIG. 1 illustrates a gas turbine engine 10 of a turbo-fan type preferably provided for use in subsonic flight, generally comprising in serial flow communication a fan 12 through which ambient air is propelled, a multistage compressor 14 for pressurizing the air, a combustor 16 in which the compressed air is mixed with fuel and ignited for generating an annular stream of hot combustion gases, and a turbine section 18 for extracting energy from the combustion gases. Engine 10 may comprise one or more components 20 used as acoustic treatment (e.g., panels or liners) disposed at different locations within engine 10 to obtain desired noise-attenuation. It is understood that component 20 may be used in other types of engines (e.g., turbo-shaft, turboprop, auxiliary power unit (APU)) and in other types of noise-attenuating applications.

In various situations, one component 20 (e.g., acoustic liner) may be disposed upstream of fan 12 inside an inlet duct of engine 10 so that noise being produce by fan 12 may be attenuated. In some embodiments, component 20 may be suitable for use in a fan case, intermediate case, bypass duct, exhaust duct, thrust reverser duct, exhaust bullet or center body of engine 10 for example. In some embodiments, component 20 may be suitable for use in a hot core section duct of engine 10 where adhesively bonded acoustic materials cannot be used due to high temperatures. Depending on the specific application, component 20 may have a generally planar or arcuate form (e.g., of single or double curvature). Component 20 may be a structural or parasitic part of a duct of a nose cowl of engine 10.

Figure 2:
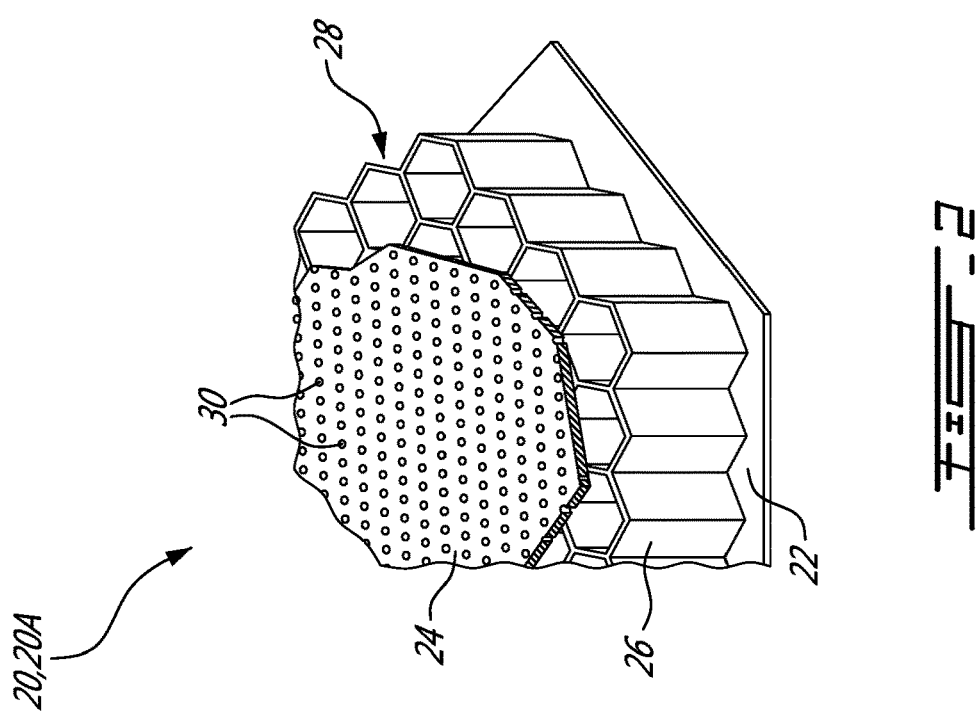
FIG. 2 is a perspective cutaway view of an exemplary single-degree-of-freedom (SDOF) acoustic panel.

FIG. 2 is a perspective cutaway view of an exemplary component 20 in the form of a single-degree-of-freedom (SDOF) acoustic panel 20A. The non-adhesive connections described further below are not shown in FIG. 2. SDOF acoustic panel 20A may comprise backing member 22, facing sheet 24 and cellular structure 26 (core) disposed between backing member 22 and facing sheet 24. Facing sheet 24 may be spaced apart from backing member 22 to define (e.g., noise-attenuating) cavity 28 between backing member 22 and facing sheet 24. As explained below, cellular structure 26 may be attached to backing member 22 and/or facing sheet 24 by one or more non-adhesive or other type(s) of connections. Cellular structure 26 may comprise walls serving as partitions defining sub-cavities (cells) within noise-attenuating cavity 28. In some embodiments, backing member 22 may have the form of a sheet and may be referred to as a "backing sheet". However, it is understood that backing member 22 may be of any suitable shape. For example, backing member 22 may be a part of another component of engine 10 such as a wall of a bypass duct of engine 10 that provides a suitable back wall for noise-attenuating cavity 28.

Figure 3:
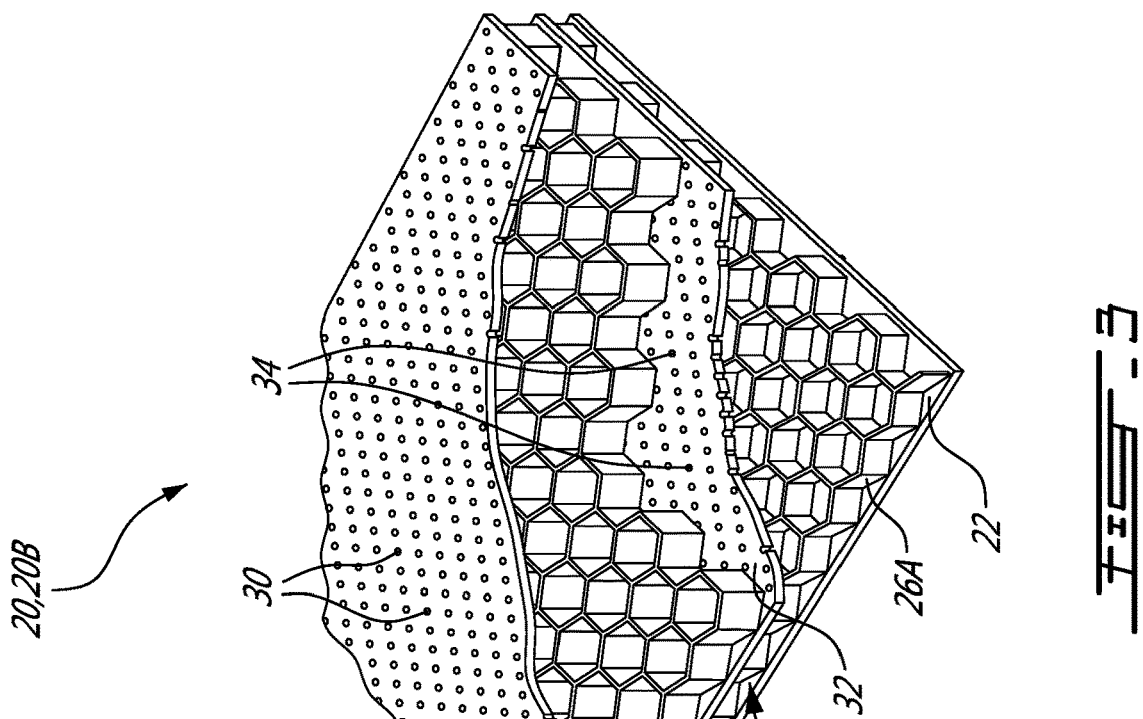
FIG. 3 is a perspective cutaway view of an exemplary double-degree-of-freedom (DDOF) acoustic panel.

FIG. 3 is a perspective cutaway view of an exemplary component 20 in the form of double-degree-of-freedom (DDOF) acoustic panel 20B. The non-adhesive connections described further below are not shown in FIG. 3. DDOF acoustic panel 20B may comprise backing member 22, septum 32, cellular structures 26A, 26B and facing sheet 24. Septum 32 may be spaced apart from backing member 22 to define (e.g., noise-attenuating) cavity 28A between backing member 22 and septum 32. Cellular structure 26A may be disposed between backing member 22 and septum 32. As explained below, cellular structure 26A may be attached to backing member 22 and septum 32 by one or more non-adhesive or other type(s) of connections.

Facing sheet 24 may be spaced apart from septum 32 to define (e.g., noise-attenuating) cavity 28B between septum 32 and facing sheet 24. Cellular structure 26B may be disposed between facing sheet 24 and septum 32. Similarly, cellular structure 26B may be attached to facing sheet 24 and septum 32 by one or more non-adhesive or other type(s) of connections. Due to its configuration, DDOF acoustic panel 20B may be configured to resonate and attenuate noise at multiple frequencies or within a wider frequency range than SDOF acoustic panel 20A.

In reference to the SDOF and DDOF acoustic panels 20A, 20B (referred generally as "component 20") of FIGS. 2 and 3 respectively, cellular structures 26A, 26B (referred generally as "cellular structure 26") may each comprise a plurality of open-ended juxtaposed cells of hexagonal or other (e.g., triangular, rectangular) cross-sectional profile. The walls defining the cells of cellular structure 26 may extend from backing member 22 to facing sheet 24 and may provide support for facing sheet 24. In the case of DDOF acoustic panel 20B, the walls defining the cells of cellular structure 26B may extend from septum 32 to facing sheet 24, and the walls defining the cells of cellular structure 26A may extend from backing member 22 to septum 32. In some embodiments, cellular structure 26 may be referred to as a "honeycomb" core. Cellular structure 26 may be made from a suitable non-metallic material (e.g., polymer), composite material (e.g., carbon fibre/resin matrix) or metallic (e.g., aluminum-based) material for example.

Outer facing sheet 24 may be porous (e.g., perforated) and may comprise a plurality of through holes 30 formed therein. Facing sheet 24 may be made from a suitable composite material (e.g., carbon fibre with resin or ceramic matrix) or metallic (e.g., aluminum-based) material. In various embodiments, facing sheet 24 may comprise a wire mesh construction and/or may comprise felt metal.

Backing member 22 may be unperforated and comprise a non-porous impermeable sheet or other relatively hard material. Backing member 22 may be made from a suitable non-metallic material (e.g., polymer), composite material (e.g., carbon fibre/resin matrix) or metallic (e.g., aluminum-based) material for example.

Septum 32 may be a porous (e.g., perforated) sheet and may comprise a plurality of through holes 34 formed therein for acoustically coupling noise-attenuating cavities 28A, 28B together. Septum 32 may be made from a suitable non-metallic material (e.g., polymer), composite material (e.g., carbon fibre/resin matrix) or metallic (e.g., aluminum-based) material for example. In some embodiments, septum 32 may comprise a perforated sheet of similar of substantially the same construction as facing sheet 24.

FIG. 4 is a flowchart of an exemplary method 100 for manufacturing component 20. In various embodiments, method 100 may be used to manufacture SDOF acoustic panel 20A or DDOF acoustic panel 20B. Method 100 may comprise receiving parts of component 20 (see block 102) and assembling the parts of component 20 using one or more non-adhesive connections (see block 104).

In cases of manufacturing SDOF acoustic panel 20A, the parts of SDOF acoustic panel 20A may include backing member 22, porous facing sheet 24 and cellular structure 26. Assembling the parts may include assembling cellular structure 26 between backing member 22 and facing sheet 24 so that backing member 22 and facing sheet 24 are spaced apart to define noise-attenuating cavity 28 therebetween. Assembling cellular structure 26 between backing member 22 and facing sheet 24 may comprise attaching cellular structure 26 to facing sheet 24 using one or more non-adhesive connections.

In cases of manufacturing a DDOF acoustic panel 20B, the parts of DDOF acoustic panel 20B may include backing member 22, porous facing sheet 24, porous septum (sheet) 32 and cellular structures 26A, 26B. Assembling the parts may include assembling cellular structure 26A between backing member 22 and septum 32 so that backing member 22 and septum 32 are spaced apart to define noise-attenuating cavity 28A therebetween. Assembling the parts may also include assembling cellular structure 26B between facing sheet 24 and septum 32 so that facing sheet 24 and septum 32 are spaced apart to define noise-attenuating cavity 28B therebetween.

Assembling cellular structure 26A between backing member 22 and septum 32 may comprise attaching cellular structure 26A to backing member 22 using one or more non-adhesive connections and/or attaching cellular structure 26A to septum 32 using one or more non-adhesive connections. Assembling cellular structure 26B between facing sheet 24 and septum 32 may comprise attaching cellular structure 26B to facing sheet 24 using one or more non-adhesive connections and/or attaching cellular structure 26B to septum 32 using one or more non-adhesive connections.

Additional details of method 100 are described below in reference to FIGS. 5-12.

Figure 5:
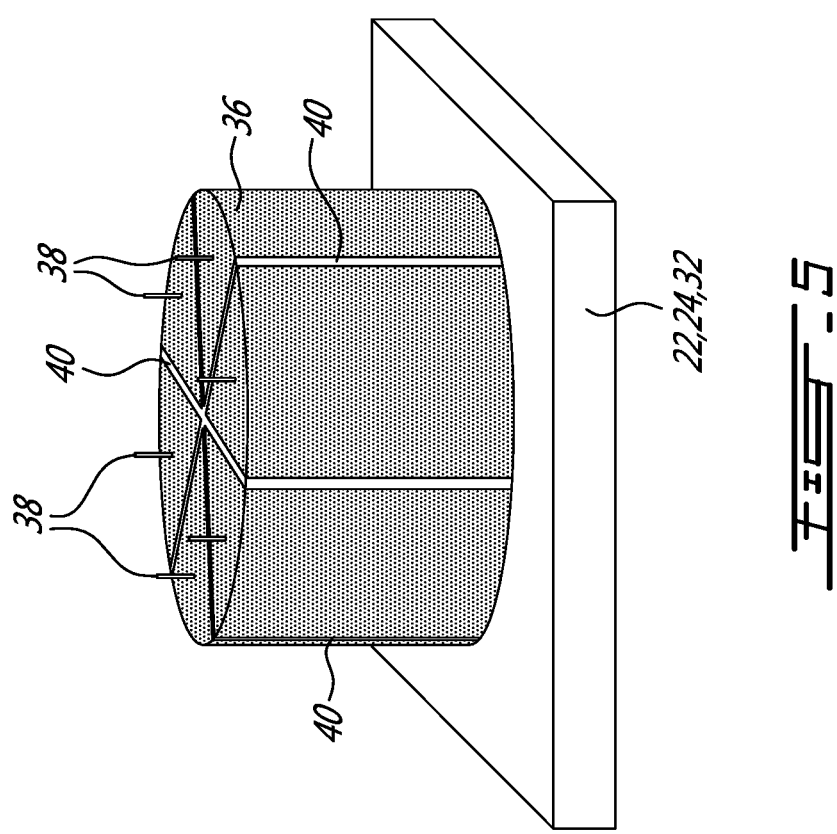
FIG. 5 is a perspective schematic view of an exemplary connection member for providing a non-adhesive connection in a component.

FIG. 5 is a perspective schematic view of an exemplary connection member 36 for providing a non-adhesive connection in component 20. Connection member 36 may be integrally-formed with or otherwise secured to backing member 22, facing sheet 24 or septum 32 of component 20. In some embodiments, connection member 36 may be formed (i.e., built-up, grown, added) to backing member 22, facing sheet 24 or septum 32 using additive manufacturing or other suitable process(es). In some embodiments, and depending on the material(s) selected for connection member 36 and backing member 22, facing sheet 24 or septum 32, the use of additive manufacturing may provide a relatively strong (e.g., metallurgical) bond between connection member 36 and backing member 22, facing sheet 24 or septum 32. In some embodiments, the material of connection member 36 and the material of backing member 22, facing sheet 24 or septum 32 may be selected to be metallurgically compatible with each other in order to provide such metallurgical bond therebetween. In some embodiments, connection member 36 may comprise a metallic (e.g., aluminum-based) material but it is understood that other types of (e.g., metallic and non-metallic) materials may also be suitable for connection member 36.

In case of a DDOF acoustic panel 20B, one or more fasteners 38 may be provided on connection member 36 or elsewhere for providing corresponding non-adhesive connections between septum 32 and backing member 22 or facing sheet 24. In some embodiments, fasteners 38 may be formed (i.e., built-up, grown, added) using additive manufacturing or other suitable process(es). Fasteners 38 may comprise the same or some other metallurgically compatible material as the material of connection member 36. Accordingly, fasteners 38 may be metallurgically bonded to connection member 36. Fasteners 38 may be generally pin-shaped and may be configured for frictional engagement with septum 32. For example, fasteners 38 may be configured to pierce/rupture and penetrate septum 32, which may be relatively softer than fasteners 38, in order to provide some non-adhesive connections between septum 32 and backing member 22 or facing sheet 24 via connection member 36. A piercing end of each fastener 38 may be relatively sharp to facilitate piercing into septum 32. In some embodiments, fastener 38 may be shaped like a nail. Alternatively, female receptor holes could be formed in septum 32 for receiving and frictionally engaging with fasteners 38 so as to form a sufficiently strong connection without necessarily using fasteners 38 to pierce/rupture septum 32.

Connection member 36 may comprise one or more slots 40 formed therein or other feature(s) for providing a suitable non-adhesive connection between cellular structure 26 and backing member 22, facing sheet 24 or septum 32 via connection member 36. Slots 40 may be formed (e.g., grown) during the additive manufacturing process. Alternatively, slots 40 may be formed (e.g., cut, machined) into connection member 36 using a suitable material removal process after the forming of connection member 36 using additive manufacturing. Slots 40 may be configured to engage with cellular structure 26 in order to provide suitable frictional engagement between cellular structure 26 and backing member 22, facing sheet 24 or septum 32 via connection member 36. In some embodiments, connection member 36 may be mostly solid. In some embodiments, part(s) of connection member 36 may be hollow.

Figure 6:
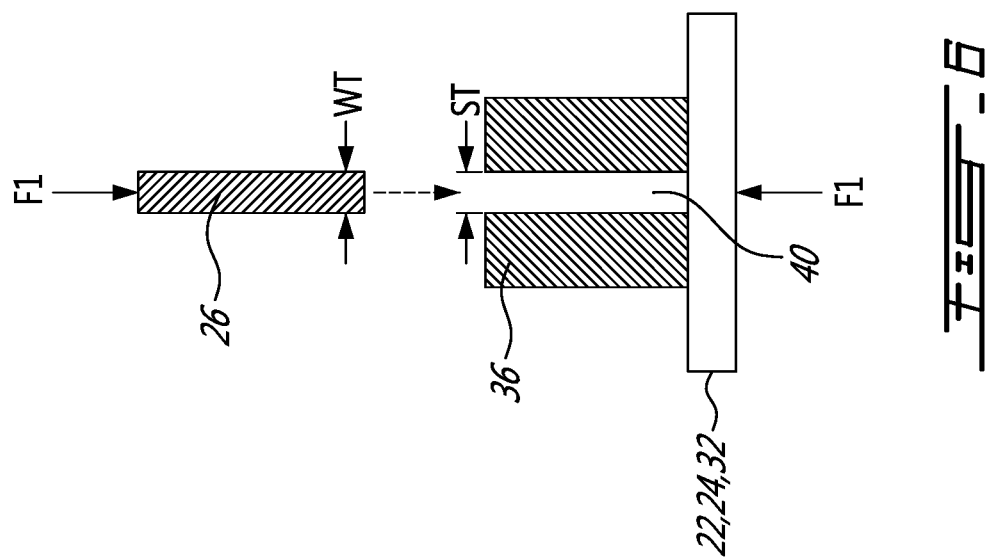
FIG. 6 is a schematic representation of an exemplary process of establishing a frictional engagement between a cellular structure and the connection member of FIG. 5.

FIG. 6 is a schematic representation of an exemplary process of establishing a non-adhesive connection between cellular structure 26 and connection member 36. During assembly of component 20, one or more walls of cellular structure 26 may be inserted into and frictionally engaged with corresponding one or more slots 40 formed in connection member 36. The wall of cellular structure 26 may have a wall thickness WT and the corresponding slot 40 of connection member 36 may have a slot thickness ST. Wall thickness WT of cellular structure 26 and slot thickness ST of slot 40 may be selected to provide an interference fit, also known as a press fit, snap fit or friction fit between cellular structure 26 and connection member 36 in order to provide suitable attachment or fastening by friction after the parts are pushed together by the application of force F1. Accordingly, wall thickness WT may slightly exceed slot thickness ST. The tightness or strength of the fit achieved by the selection of wall thickness WT and slot thickness ST may provide a suitable attachment between cellular structure 26 and connection member 36 so that no other means of connection may be required between cellular structure 26 and connection member 36. For example, the tightness or strength of the fit may be controlled by an amount of interference selected via wall thickness WT and slot thickness ST. In other words, the wall(s) of cellular structure 26 may be frictionally retained in slot(s) 40 of connection member 36.

FIG. 7 is a schematic representation of a plurality of connection members 36 providing non-adhesive connections between porous facing sheet 24 (or septum 32) and cellular structure 26 of component 20. Connection members 36 may be formed on facing sheet 24 or septum 32 using additive manufacturing as described above. The number, individual size and layout of connection members 36 on an inner side of facing sheet 24 or on septum 32 may be selected to provide the desired attachment/retention of cellular structure 26 with facing sheet 24 or with septum 32. In various embodiments, slot(s) 40 (see FIG. 5) of one or more connection members 36 may be configured to receive therein only a straight wall portion of cellular structure 26. Alternatively or in addition, slot(s) 40 of one or more connection members 36 may be configured to receive therein part of two or more intersecting and non-parallel walls of cellular structure 26. For example, connection members 36 may each comprise one or a plurality of linear slots 40. In cases of one or more connection members 36 comprising a plurality of slots 40, such slots 40 may have orientations corresponding to the relative orientations of adjacent intersecting walls of cellular structure 26 so that intersecting portions of cellular structure 26 may be received in slot(s) 40 and thereby frictionally engaged with corresponding connection members 36 as shown in FIG. 7. In some embodiments one or more connection members 36 may each frictionally engage part of three adjacent cells of cellular structure 26.

The arrangement of facing sheet 24 (or septum 32), connection members 36 and cellular structure 26 may be used in the manufacturing of SDOF acoustic panel 20A or of DDOF acoustic panel 20B.

FIG. 8 is a schematic elevation view of an exemplary SDOF acoustic panel 20A comprising non-adhesive connections between cellular structure 26 and porous facing sheet 24 provided by connection members 36. Facing sheet 24 may be spaced apart from backing member 22 to define noise-attenuating cavity 28 therebetween. In some embodiments, SDOF acoustic panel 20A may be manufactured using one or more non-adhesive connections and also using one or more adhesive connections. For example, since backing member 22 is unperforated, a suitable adhesive substance 42 (e.g., epoxy resin adhesive, glue) may be used to secure the edges of the cells of cellular structure 26 to backing member 22 without concerns of holes in backing member 22 getting blocked by adhesive substance 42. In some embodiments, an adhesive reticulation process using a suitable film adhesive may be used to form one or more adhesive connections between cellular structure 26 and backing member 22.

As shown in FIG. 8, the height of connection members 36 from facing sheet 24 may be less than a thickness of cellular structure 26 and hence less than a height h1 of noise-attenuating cavity 28 since connection members 36 are not used to attach cellular structure 26 to backing member 22. The height of connection members 36 may be selected to frictionally engage a desired amount/height of cellular structure 26 to provide the desired amount of retention. In the SDOF acoustic panel 20A shown in FIG. 8, fasteners 38 shown in FIG. 5 may not be required. Accordingly, connection members 36 may be formed without any fasteners 38 extending therefrom in some embodiments.

SDOF acoustic panel 20A may be configured to resonate and attenuate noise at a single frequency or within a narrow frequency range. In some embodiments, one or more holes 30 may be in communication with each cell defined by cellular structure 26 and each cell may function as a Helmholtz resonant cavity. Noise-attenuating cavity 28 of SDOF acoustic panel 20A may have a height h1 and facing sheet 24 may have a thickness t1. Holes 30 extending through facing sheet 24 may each have a diameter d1. Structural parameters of SDOF acoustic panel 20A such as height h1, diameter d1 of holes 30 and thickness t1 of facing sheet 24 may be selected to obtain desired noise-attenuation properties.

In some embodiments, a highly resistive material such as a mesh of porous material may be disposed inside the cells defined by cellular structure 26 in cavity 28 and may alter the noise-attenuating performance of acoustic panel 20A. In some situations, the use of such highly resistive material may cause acoustic panel 20A to have a noise-attenuating performance that is more similar to that of a DDOF acoustic panel even though it has a SDOF acoustic panel construction.

FIGS. 9-12 relate to the manufacturing of DDOF acoustic panel 20B using one or more non-adhesive connections. In some embodiments, DDOF acoustic panel 20B may comprise connection members 36 on both backing member 22 and facing sheet 24. In reference to FIGS. 9-11, reference character 36A is used to denote connection members secured to backing member 22 and reference character 36B is used to denote connection members secured to facing sheet 24. Similarly, reference character 38A is used to denote fasteners secured to backing member 22 via connection members 36A and reference character 38B is used to denote fasteners secured to facing sheet 24 via connection members 36B.

FIG. 9 is a schematic representation of a plurality of connection members 36A providing non-adhesive connections between backing member 22 and cellular structure 26A of DDOF acoustic panel 20B. Details of the configuration and manufacturing of the arrangement of FIG. 9 can be similar to that described above in relation to facing sheet 24 and the arrangement of FIG. 7. Connection members 36A may be formed on backing member 22 using additive manufacturing or other suitable manufacturing process. In order to manufacture DDOF acoustic panel 20B, the upper assembly including facing sheet 24, connection members 36 and cellular structure 26 as shown in FIG. 7 may be used in conjunction with the lower assembly including backing member 22, connection members 36A and cellular structure 26A shown in FIG. 9. In contrast with the assembly of FIG. 7, the height of connection members 36B may span a greater portion of the thickness of cellular structure 26B (see FIG. 11). In some embodiments, the height of connection members 36B may be substantially the same as the thickness (e.g., height h2) of cellular structure 26B. In addition, connection members 36B of the upper assembly may be provided with fasteners 38B similar to those shown in FIG. 9. In some embodiments, the height of connection members 36A may be substantially the same as the thickness (e.g., height h1) of cellular structure 26A. In some embodiments, cellular structures 26A, 26B may have different configurations including different heights and/or cell sizes for example.

FIG. 10 is a schematic representation of a process for forming non-adhesive connections between connection member 36B and septum 32 via fasteners 38B and for forming non-adhesive connections between connection member 36A and septum 32 via fasteners 38A. During the assembly of DDOF acoustic panel 20B, fasteners 38A, 38B may be used to provide non-adhesive connection(s) between the upper assembly comprising facing sheet 24 and cellular structure 26B, and, the lower assembly comprising backing member 22 and cellular structure 26A. The material and thickness of septum 32 may be selected so that septum 32 may be penetrated/ruptured by fasteners 38A as connection member 36A is pressed against septum 32, and by fasteners 38B as connection member 36B is pressed against septum 32. FIG. 10 shows opposite connection members 36A, 36B being simultaneously urged toward septum 32 from opposite sides of septum 32 by the application of force F2 but it is understood that connection members 36A, 36B may be urged toward septum 32 at different times. The pressing of connection members 36A, 36B against septum 32 may cause the corresponding fasteners 38A, 38B to penetrate septum 32 from opposite sides and thereby frictionally engage (e.g., become anchored) with septum 32 so as to form suitable non-adhesive connections with septum 32. Alternatively, female receptor holes could be formed in septum 32 for receiving and frictionally engaging with fasteners 38 so as to form a sufficiently strong connection without necessarily using fasteners 38 to pierce/rupture septum 32.

FIG. 11 is a schematic elevation view of an exemplary DDOF acoustic panel 20B comprising non-adhesive connections. DDOF acoustic panel 20B may comprise the following:

backing member 22;

septum 32 spaced apart from backing member 22 to define noise-attenuating cavity 28A between backing member 22 and septum 32;

cellular structure 26A disposed between backing member 22 and septum 32 where cellular structure 26A is attached to backing member 22 and/or septum 32 by one or more non-adhesive connections;

facing sheet 24 spaced apart from septum 32 to define noise-attenuating cavity 28B between septum 32 and facing sheet 24; and cellular structure 26B disposed between septum 32 and facing sheet 24 where cellular structure 26B is attached to septum 32 and/or facing sheet 24 by one or more second non-adhesive connections.

Connection members 36A may be secured (e.g., metallurgically bonded) to backing member 22 and frictionally engaged with cellular structure 26A (e.g., via slots 40). Similarly, connection members 36B may be secured (e.g., metallurgically bonded) to facing sheet 24 and frictionally engaged with cellular structure 26B (e.g., via slots 40).

Fasteners 38A may be secured (e.g., metallurgically bonded) to connection members 36A and frictionally engaged with septum 32. Fasteners 38B may be secured (e.g., metallurgically bonded) to connection members 36B and frictionally engaged with septum 32.

It is understood that the use of non-adhesive connections as explained herein could be combined with adhesive connections in order to produce either SDOF acoustic panel 20A or DDOF acoustic panel 20B.

FIG. 12 is a schematic elevation view of another exemplary DDOF acoustic panel 20B comprising non-adhesive connections. In the context of DDOF acoustic panel 20B, connection members 36A, 36B could be added to opposite sides of septum 32 using additive manufacturing for the purpose of providing a frictional engagement with corresponding cellular structures 26A, 26B. In this situation, cellular structure 26A could be attached to backing plate 22 using adhesive reticulation (e.g., see adhesive substance 42A) and cellular structure 26B could be attached to facing plate 24 using adhesive reticulation (e.g., see adhesive substance 42B). The use of adhesive reticulation could potentially cause some holes 30 of facing sheet 24 to be blocked by adhesive material but any blocked holes 30 could potentially be subsequently cleared using a jet of compressed air for example.

Due to its configuration, DDOF acoustic panel 20B may be configured to resonate and attenuate noise at multiple frequencies or within a wider frequency range compared to SDOF acoustic panel 20A. In some embodiments, one or more holes 30 in facing sheet 24 (see FIG. 7) may be in communication with each cell defined by cellular structure 26B of noise-attenuating cavity 28B and each cell of noise-attenuating cavity 28B may function as a Helmholtz resonant cavity. Noise-attenuating cavity 28A may be in acoustic communication with noise-attenuating cavity 28B via holes 34 extending through septum 32 (see FIG. 10). Each cell defined by cellular structure 26A of noise-attenuating cavity 28A may also function as a Helmholtz resonant cavity.

Noise-attenuating cavity 28A may have a height h1, noise-attenuating cavity 28B may have a height h2, facing sheet 24 may have a thickness t1 and septum 32 may have a thickness t2. Holes 30 in facing sheet 24 may each have a diameter d1 (see FIG. 7). Holes 34 in septum 32 may each have a diameter d2 (see FIG. 10). Structural parameters of DDOF acoustic panel 20A such as heights h1 and h2, diameters d1 and d2 of holes 30 and 34 respectively, thickness t1 of facing sheet 24 and thickness t2 of septum 32 may be selected to obtain desired noise-attenuation properties.

Aspects of this disclosure may permit DDOF acoustic panels 20B to be manufactured as "drop-in" units/components outside of engine 10 (or nacelle) and that are ready to be inserted into suitable slots in engine 10. Such construction of DDOF acoustic panels 20B may facilitate installation and replacement of DDOF acoustic panels in the structure of engine 10.

It is also understood that aspects of this disclosure could be applied to acoustic panels of types other than those disclosed herein such as felt-metal acoustic liners and 3-degree-of-freedom (3DOF) acoustic panels.

The above description is meant to be exemplary only, and one skilled in the relevant arts will recognize that changes may be made to the embodiments described without departing from the scope of the invention disclosed. The present disclosure may be embodied in other specific forms without departing from the subject matter of the claims. The present disclosure is intended to cover and embrace all suitable changes in technology. Modifications which fall within the scope of the present invention will be apparent to those skilled in the art, in light of a review of this disclosure, and such modifications are intended to fall within the appended claims. Also, the scope of the claims should not be limited by the preferred embodiments set forth in the examples, but should be given the broadest interpretation consistent with the description as a whole.

What is claimed is:

1. An aircraft component comprising:
   a backing member;
   a porous sheet spaced apart from the backing member to define a cavity between the backing member and the porous sheet;
   a connection member secured to the backing member or to the porous sheet, the connection member including a slot; and
   a cellular structure disposed between the backing member and the porous sheet, the cellular structure being attached to at least one of the backing member and the porous sheet by one or more non-adhesive connections including a wall of the cellular structure inserted into and frictionally retained in the slot of the connection member.

2. The aircraft component as defined in claim 1, wherein the porous sheet is a facing sheet of the aircraft component and the cellular structure is attached to the facing sheet via the one or more non-adhesive connections.

3. The aircraft component as defined in claim 1, wherein the porous sheet is a facing sheet of the aircraft component and the connection member is secured to the facing sheet.

4. The aircraft component as defined in claim 3, wherein the connection member is metallurgically bonded to the facing sheet.

5. The aircraft component as defined in claim 3, comprising a septum disposed between two cavities defined between the backing member and the facing sheet of the aircraft component, the cellular structure being attached to the septum via the one or more non-adhesive connections.

6. The aircraft component as defined in claim 5, comprising a fastener secured to the facing sheet and frictionally engaged with the septum.

7. The aircraft component as defined in claim 6, wherein the fastener penetrates the septum.

8. The aircraft component as defined in claim 1, wherein the cellular structure is attached to the backing member via the one or more non-adhesive connections.

9. The aircraft component as defined in claim 8, wherein the connection member is secured to the backing member.

10. The aircraft component as defined in claim 9, wherein the connection member is metallurgically bonded to the backing member.

11. The aircraft component as defined in claim 9, wherein the porous sheet is a septum disposed between two cavities of the aircraft component, the cellular structure being attached to the septum via the one or more non-adhesive connections.

12. The aircraft component as defined in claim 11, comprising a fastener secured to the backing member and frictionally engaged with the septum.

13. An aircraft component comprising:
a backing member;
a septum spaced apart from the backing member to define a first cavity between the backing member and the septum;
a first cellular structure disposed between the backing member and the septum, the first cellular structure being attached to at least one of the backing member and the septum by one or more first non-adhesive connections;
a facing sheet spaced apart from the septum to define a second cavity between the septum and the facing sheet; and
a second cellular structure disposed between the septum and the facing sheet, the second cellular structure being attached to at least one of the septum and the facing sheet by one or more second non-adhesive connections;
wherein at least one of the following:
the one or more first non-adhesive connections include a wall of the first cellular structure inserted into and frictionally retained in a slot of a first connection member secured to the backing member or to the septum; and
the one or more second non-adhesive connections include a wall of the second cellular structure inserted into and frictionally retained in a slot of a second connection member secured to the facing sheet or to the septum.

14. The aircraft component as defined in claim 13, wherein:
the first connection member is secured to the backing member and the wall of the first cellular structure is frictionally retained in the slot of the first connection member; and
the second connection member is secured to the facing sheet and the wall of the second cellular structure is frictionally retained in the slot of the second connection member.

15. The aircraft component as defined in claim 14, wherein:
the first connection member is metallurgically bonded to the backing member; and
the second connection member is metallurgically bonded to the facing sheet.

16. The aircraft component as defined in claim 15, comprising:
a first fastener metallurgically bonded to the first connection member and frictionally engaged with the septum; and
a second fastener metallurgically bonded to the second connection member and frictionally engaged with the septum.

17. A method of manufacturing an aircraft component, the method comprising:
receiving a backing member, a porous sheet and a cellular structure; and
assembling the cellular structure between the backing member and the porous sheet so that the backing member and the porous sheet are spaced apart to define a cavity therebetween, wherein assembling the cellular structure between the backing member and the porous sheet comprises attaching the cellular structure to at least one of the backing member and the porous sheet using one or more non-adhesive connections including a wall of the cellular structure inserted into and frictionally retained in a slot of a connection member secured to the backing member or to the porous sheet.

18. The method as defined in claim 17, comprising using additive manufacturing to form the connection member on the backing member or on the porous sheet.

19. The method as defined in claim 17, wherein:
the porous sheet is a septum for assembling between two cavities defined between the backing member and a facing sheet of the aircraft component;
the cellular structure is a first cellular structure for assembling between the septum and the backing member;
the connection member is a first connection member; and
the method further comprises:
using additive manufacturing to form the first connection member on the backing member;
frictionally engaging the first cellular structure with the first connection member;
receiving the facing sheet;
using additive manufacturing to form a second connection member on the facing sheet;
receiving a second cellular structure for assembling between the septum and the facing sheet; and
frictionally engaging the second cellular structure with the second connection member.

20. The method as defined in claim 19, comprising:
using additive manufacturing to form a first fastener on the first connection member and a second fastener on the second connection member; and
frictionally engaging the first and second fasteners with the septum.

* * * * *